United States Patent [19]

Geco

[11] Patent Number: 5,078,411
[45] Date of Patent: Jan. 7, 1992

[54] VARIABLE MAGNETIC ROTARY SEAL

[76] Inventor: Norman Geco, 1120 Donaire Way, Pacific Palisades, Calif. 90272

[21] Appl. No.: 298,621

[22] Filed: Jan. 18, 1989

[51] Int. Cl.$^5$ .............................................. E21B 33/00
[52] U.S. Cl. ................................ 277/80; 277/81 R; 277/96
[58] Field of Search ................ 277/80, 81 R, 96, 96.1, 277/198

[56] References Cited

U.S. PATENT DOCUMENTS

| 2,944,843 | 7/1960 | Colby | 277/80 |
|---|---|---|---|
| 3,050,319 | 8/1962 | Colby | 277/80 |
| 3,080,170 | 3/1963 | Colby | 277/80 |
| 3,170,409 | 2/1965 | McLeod et al. | 277/80 |
| 3,708,177 | 1/1973 | Baerman | 277/80 |
| 4,389,051 | 6/1983 | Mullaney | 277/81 R |
| 4,669,735 | 6/1989 | Sundberg et al. | 277/85 |
| 4,795,168 | 1/1989 | Adams et al. | 277/80 |

FOREIGN PATENT DOCUMENTS

| 613712 | 1/1961 | Canada | 277/80 |
|---|---|---|---|
| 2514455 | 4/1983 | France | 277/80 |
| 347396 | 8/1960 | Switzerland | 277/80 |
| 788385 | 6/1956 | United Kingdom | 277/80 |
| 833949 | 5/1960 | United Kingdom | 277/80 |
| 1256549 | 12/1971 | United Kingdom | 277/80 |

OTHER PUBLICATIONS

H. Hugo Buchter, Industrial Sealing Technology, 1979 pp. 204-206.

Primary Examiner—William A. Cuchlinksi, Jr.
Assistant Examiner—Daniel G. DePumpo
Attorney, Agent, or Firm—W. Edward Johansen

[57] ABSTRACT

A variable magnetic rotary seal sealingly couples a shaft to a housing as the shaft rotates. The variable magnetic rotary seal includes a seal head, a seal ring and a mating ring. The seal head is formed out of a non-magnetic material. The seal head has a first annular surface in the first plane with a circular groove therein and a second annular surface with a plurality of recesses. Each recess has a bottom wall. The sealing ring is disposed in the circular groove and is mechanically coupled thereto. A first "O" ring sealingly couples the seal head to the shaft. The mating ring is formed out of a magnetic, heat-treated and hardened material. The mating ring surrounds the shaft. The mating ring has an annular sealing surface in a second plane which is parallel and adjacent to the first plane. a second "O" ring sealingly couples the mating ring to the housing and secures the mating ring against rotation relative to the shaft. The variable magnetic rotary seal also includes a plurality of separate magnets. Each magnet is disposed in one of the plurality of recesses of the seal head. The seal head draws the sealing ring and the mating ring toward each other so that the annular sealing surface of the mating ring fluidly engages with the sealing ring.

2 Claims, 3 Drawing Sheets

VARIABLE MAGNETIC ROTARY SEAL

BACKGROUND OF THE INVENTION

1. Field of the Invention

This invention relates to a magnetic rotary seal and more particularly to a variable magnetic rotary seal which is for use in aircraft, aerospace, marine, pumps, blowers, automotive and bearing housings.

2. Description of the Prior Art

U.S. Pat. No. 2,843,403, entitled Rotary Seal, issued to Robert Stevenson on July 15, 1958, teaches a rotary seal which sealingly couples a housing to a shaft mechanism. The rotary seal includes a first member, a second member and a springless mechanism. The shaft extends through the housing. The first member is held against rotation relative to the housing. The first member has a first annular sealing surface in a first plane. The second member has a second annular sealing surface in a second plane. The first plane is parallel and adjacent to the second plane. The second annular sealing face fluidly engages with the first annular sealing surface. The second member is mounted on the shaft for rotation therewith. A soft "O" ring is disposed between the shaft and the first member in order to mount the soft "O" ring so that it is anchored to the shaft. The first member still has axial and rocking movement relative to the shaft for engagement and alignment of the faces. The springless mechanism secures the second member to the housing. The springless mechanism is disposed uniformly circularly about the axis is of the shaft and consists of a sealing ring and a mating ring. The mating ring has a plurality of recesses and a plurality of wall sleeves. Each recess has a bottom wall. Each wall sleeve is made out of a non-magnetic conducting material, such as lead or brass. The mating ring carries a plurality of equally spaced, separate cylindrical plugs. Each cylindrical plug is made out of a magnetized material, such as "Alnico." Each cylindrical plug is disposed in one of the plurality of wall sleeves. A wall sleeve must surround each cylindrical plug. Each recess frictionally receives one of the wall sleeves. The plurality of cylindrical plug magneticly attracts the sealing ring. The second member carries the sealing ring in order to draw the sealing faces together. The rotary seal prevents the escape of fluid under pressure from between the two relatively rotatable parts. If it is more convenient for manufacturing each recess may be made in the blank of the mating ring prior to the hardening process.

U.S. Pat. No. 2,913,289, entitled Ball Bearing Seal, issued to Robert Stevenson on Nov. 17, 1959, teaches a rotatable sleeve which is used in combination with a ball-bearing which has two ball races. One ball race is provided with a sealing surface. The rotatable sleeve is held against rotation relative to the other ball race. The rotatable seal has a sealing surface thereon projecting into sealing engagement with the first sealing surface. A ring type magnet is carried by the rotatable sleeve which cooperates magnetically with the ball bearing to axially urge the sealing surfaces into engagement. The first ball race is the inner ball race of the bearing. The seal has an "Alnico" mating ring with a carbon steel seal head. The seal pulls both parts together. Since the strength of the "Alnico" magnet is limited because of its low magnetic pull the length of the carbon face which is the major wear component is limited.

U.S. Pat. No. 3,080,170, entitled Seal Providing for Substantial Axial Movement issued to George E. Colby on Mar. 5, 1963, teaches an annular seal member which is used in a seal between a shaft and a housing. The shaft extends through the housing in which the shaft has axial movement relative to the housing of a predetermined distance. The annular sealing member is disposed in the housing. The annular sealing member surrounds the shaft and has an annular recess which extends radially from the shaft. An "O" ring is disposed in the recess and has a body circular in cross section engaging the shaft. One half of the circumference of the cross section of the body of the "O" ring is greater than the predetermined distance of the axial movement of the parts. In order to prevent rolling of the "O" ring greater than 180 degrees, the recess has end walls which are fixed relative to each other between the "O" ring. The end walls are spaced in an axial dimension at least equal to one half of the circumference of the "O" ring body in order to prevent restriction of rolling of the "O" ring.

U.S. Pat. No. 3,050,319, entitled Radially Contacting Seal with Balancing Sleeve, issued to George E. Colby on Aug. 21, 1962, teaches a rotary seal which prevents the escape of fluid under pressure from between relatively rotatable parts. The rotary seal includes a housing, a shaft, a first member, and a second member. The shaft extends through the housing. The first member surrounds the shaft and has an annular sealing surface thereon in a single plane. An "O" ring between the first member and the housing anchoring the first member thereto against relative rotary movement. The second member has an annular sealing surface thereon in a single plane in fluid sealing engagement with the first annular sealing surface, an "O" ring between the second member and the shaft anchoring the second member thereto against relatively rotatable movement. One member is wholly a magnetized material and the other member includes a magnetically attracted material drawing the sealing faces together. The two members together are spaced at one of their ends for a limited axial movement together relative to the housing and the shaft and the members are also spaced from the parts along their circular surfaces sufficiently for individual rocking movement of the members about the "O" rings for alignment of the sealing faces. The members are unrestrained by any external influence and rotation of the shaft, even though its axis is at a slight angle to the axis of the housing will cause the members to align the sealing faces in a plane perpendicular to the shaft axis.

U.S. Pat. No. 3,708,177, entitled Magnetic Seal for a Rotary Shaft and Magnet Therefor, issued to Max Baermann on Jan. 2, 1973, teaches a magnetic seal which includes a cylindrical magnetic member for surrounding a rotary shaft. The rotary shaft projects through a housing. The cylindrical magnetic member includes an outer circumferential seal cooperating with the housing. A cylindrical magnetically attractive member also surrounds the rotary shaft and includes an inner circumferential seal cooperating with the rotary shaft. The magnetically attractive member rotates with the rotary shaft and a magnet is stationary with housing. A sealing member is interposed between the magnet and the magnetically attractive member. Magnetic attraction between the magnet and the magnetically attractive member draws the two members together to form a seal with the interposed sealing member. The magnet is molded of anisotopic ferrite permanent magnet material which is oriented in a radial direction during molding and is also radially magnetized.

U.S. Pat. No. 2,944,843, entitled Spring Loaded Seal, issued to George E. Colby on July 12, 1960, teaches a fluid seal device which effects a fluid tight sealing between two relatively rotatable members. A resilient mechanism urges the sealing faces on the members into sealing engagement. A magnet urges the members into sealing engagement. The magnet exerts a force sufficient to critically dampen the resilient mechanism and less than the force required to form a fluid tight seal between the faces.

SUMMARY OF INVENTION

In view of the foregoing factors and conditions which are characteristic of the prior art it is the primary object of the present invention to provide a variable magnetic rotary seal which is for use in aircraft, aerospace, marine, pumps, blowers, automotive and bearing housings.

It is another object of the present invention to provide a variable magnetic rotary seal which improves upon the magnetic forces acting on the seal faces to prevent flux migration that occurs with standard magnetic sealing devices in which "Alnico" mating ring magnets are used.

In accordance with the present invention an embodiment of a variable magnetic rotary seal which sealingly couples a shaft to a housing as the shaft rotates is described. The variable magnetic rotary seal includes a seal head, a seal ring and a mating ring. The seal head is formed out of a non-magnetic material. The seal head has a first annular surface in the first plane with a circular groove therein and a second annular surface with a plurality of recesses. Each recess has a bottom wall. The sealing ring is disposed in the circular groove and is mechanically coupled thereto. A first "O" ring sealingly couples the seal head to the shaft. The mating ring is formed out of a magnetic, heat-treated and hardened material. The mating ring surrounds the shaft. The mating ring has an annular sealing surface in a second plane which is parallel and adjacent to the first plane. A second "O" ring sealingly couples the mating ring to the housing and secures the mating ring against rotation relative to the shaft. The variable magnetic rotary seal also includes a plurality of separate magnets. Each magnet is disposed in one of the plurality of recesses of the seal head. The seal head draws the sealing ring and the mating ring toward each other so that the annular sealing surface of the mating ring fluidly engages with the sealing ring.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
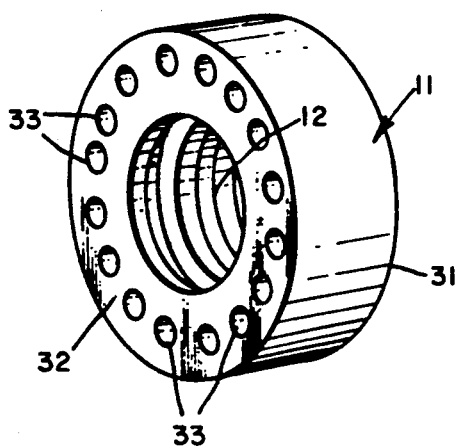
FIG. 1 is a perspective view of a seal head of a first variable magnetic rotary seal which has been constructed in accordance with the principles of the first embodiment of the present invention.
Figure 2:
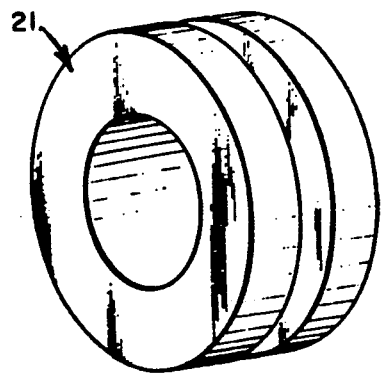
FIG. 2 is a perspective view of a mating ring of the first variable magnetic rotary seal of FIG. 1.

In order to best understand the present invention it is necessary to refer to the following description of its preferred embodiment in conjunction with the accompanying drawing. Referring to FIG. 1 in conjunction with FIG. 2 a first variable magnetic rotary seal 10 includes a seal head 11, a seal ring 12 and a mating ring 21. The seal head 11 is formed out of a non-magnetic material. The seal head 11 has a first annular surface 31 in the first plane with a circular groove therein and a second annular surface 32 with a plurality of recesses 33. Each recess 33 has a bottom wall. The sealing ring 12 is disposed in the circular groove and is mechanically coupled thereto. The mating ring 21 is formed out of a magnetic, heat-treated and hardened material. The mating ring 21 may have a magnetic material hardened face. The mating ring 21 has an annular sealing surface in a second plane which is parallel and adjacent to the first plane.

Figure 3:
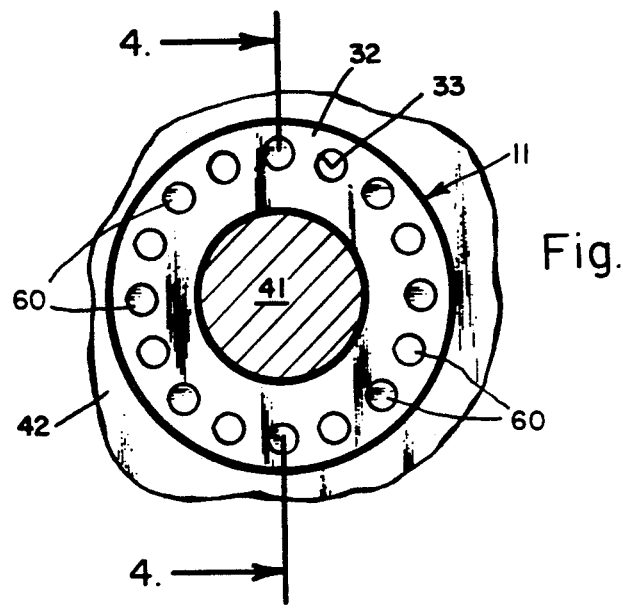
FIG. 3 is a front elevation of the first variable magnetic rotary seal of FIG. 1, a shaft and a housing showing the shaft in cross-section.
Figure 4:
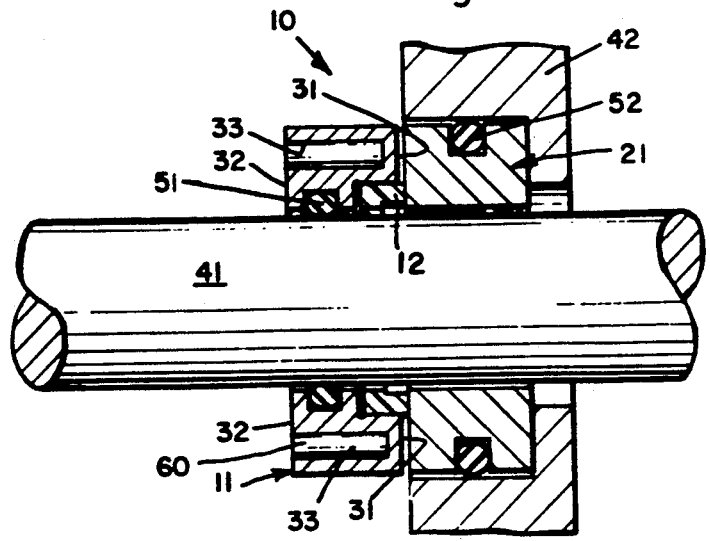
FIG. 4 is a side elevation of the housing and the first variable magnetic rotary seal of FIG. 1 in cross-section taken along line 4—4 of FIG. 3.

Referring to FIG. 3 in conjunction with FIG. 4 the first variable magnetic rotary seal 10 sealingly couples a shaft 41 to a housing 42 as the shaft 41 rotates. The mating ring 21 surrounds the shaft 41. A first "O" ring 51 sealingly couples the seal head to the shaft. A second "O" ring 52 sealingly couples the mating ring 21 to the housing 42 and secures the mating ring 21 against rotation relative to the shaft 41. The first variable magnetic rotary seal 10 also includes a plurality of separate magnets 60. Each magnet 60 is disposed in one of the plurality of recesses 33 of the seal head 11. The seal head 11 draws the sealing ring 12 and the mating ring 21 toward each other so that the annular sealing surface of the mating ring 21 engages with the sealing ring 12.

Figure 5:
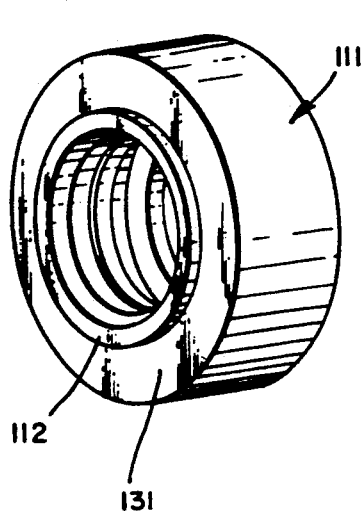
FIG. 5 is a perspective view of a seal head of a second variable magnetic rotary seal which has been constructed in accordance with the principles of the second embodiment of the present invention.
Figure 6:
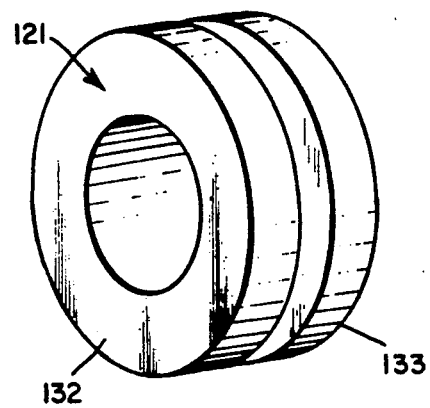
FIG. 6 is a perspective view of a mating ring of the second variable magnetic rotary seal of FIG. 5.

Referring to FIG. 5 in conjunction with FIG. 6 a second variable magnetic rotary seal 110 includes a seal head 111, a seal ring 112 and a mating ring 121. The seal head 111 is formed out of a magnetic material. The seal head 111 has a first annular surface 131 in the first plane with a circular groove therein. The sealing ring 112 is disposed in the circular groove and is mechanically coupled thereto. The mating ring 121 is formed out of a non-magnetic material. The mating ring 121 has an annular sealing surface 132 in a second plane which is parallel and adjacent to the first plane and a second annular surface 133 with a plurality of recesses 134 each of which has a bottom wall.

Figure 8:
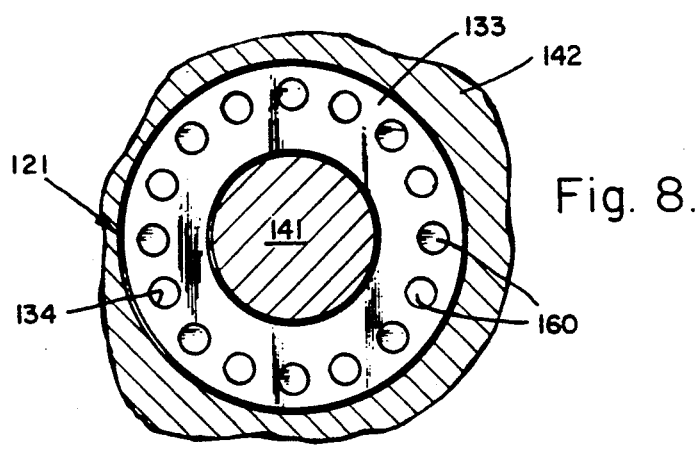
FIG. 8 is a front elevation of the housing and the second variable magnetic rotary seal of FIG. 5 in cross-section taken along line 8—8 of FIG. 7.
Figure 7:
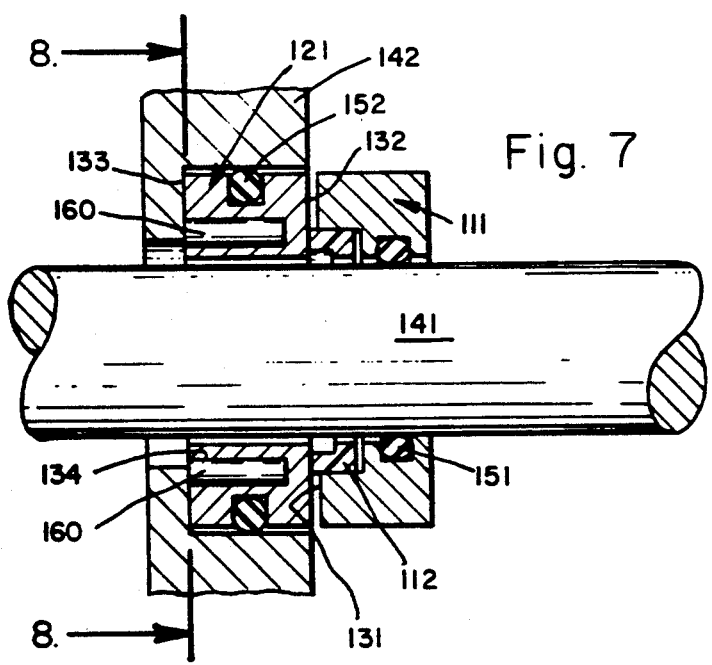
FIG. 7 is a side elevation of the second variable magnetic rotary seal of FIG. 5, a shaft and a housing showing the shaft in cross-section.

Referring to FIG. 7 in conjunction with FIG. 8 the second variable magnetic rotary seal 110 sealingly couples a shaft 141 to a housing 142 as the shaft 141 rotates. The mating ring 121 surrounds the shaft 141. A first "O" ring 151 sealingly couples the seal head to the shaft. A second "O" ring 152 sealingly couples the mating ring 121 to the housing 142 and secures the mating ring 121 against rotation relative to the shaft 141. The second variable magnetic rotary seal 110 also includes a plurality of separate magnets 160. Each magnet 160 is disposed in one of the plurality of recesses 134 of the mating ring 121. The mating ring 121 draws the sealing ring 112 and the seal head 111 toward each other so that the annular sealing surface of the mating ring 121 engages with the sealing ring 112. The mating ring 121 is made out of a non-magnetic material so that it will not collect iron particles which can damage the seal face. Any particles floating around the fluid will be picked up by the magnets 160 in the seal head 111. These magnets 160 pick up the magnetic particles to prevent them from getting into the seal face and causing the rotary seal to leak.

Figure 9:
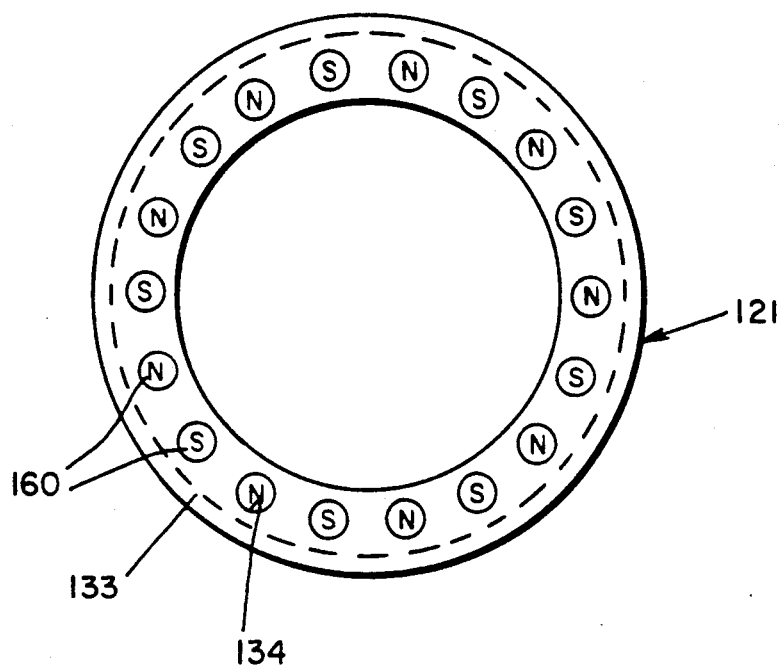
FIG. 9 is a front elevation of a mating ring of the second variable magnetic rotary seal of FIG. 5.
Figure 10:
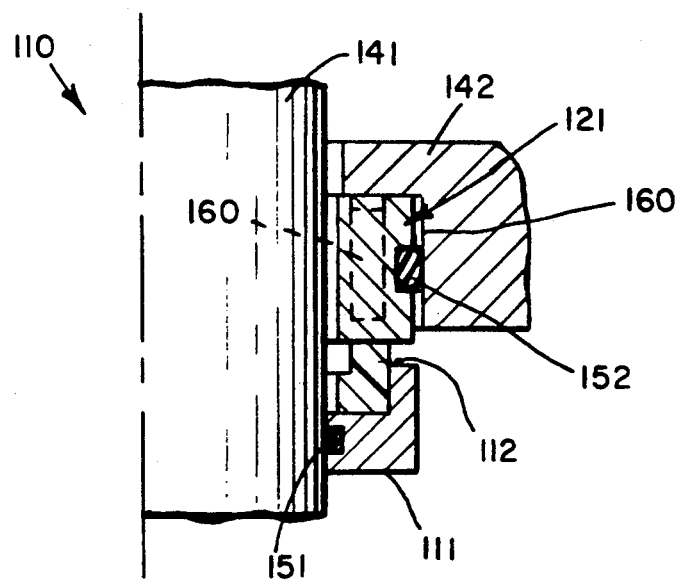
FIG. 10 is a partial side elevation of the second variable magnetic rotary seal of FIG. 5 in cross-section.

Referring to FIG. 9 in conjunction with FIG. 10 the second variable magnetic rotary seal 110 includes a seal head 111, a sealing ring 112 and a mating ring 121. The second variable magnetic rotary seal 110 sealingly couples a shaft to a housing as the shaft rotates. The mating ring 121 surrounds the shaft. The first "O" ring 151 sealingly couples the seal head to the shaft. The second "O" ring 152 sealingly couples the mating ring 121 to the housing and secures the mating ring 121 against rotation relative to the shaft. The second variable magnetic rotary seal 110 also includes a plurality of separate magnets 160. Each magnet 160 is disposed in one of the plurality of recesses of the mating ring 121 The mating ring 12) draws the sealing ring 112 and the seal head 111 toward each other so that the annular sealing surface of the mating ring 121 fluidly engages with the sealing ring 112. There are no magnets 160 in the rating ring 121. The sealing ring 112 rides against the mating ring 121 is longer than the sealing ring of U.S. Pat. No. 2,843,403 thereby giving the variable magnetic rotary seal 110 a much longer life. The seal head 111 can be made from bronze, teflon, teflon filled, tungsten carbide, silicone carbide, or any material suitable and available. The magnets 160 are put in the recesses 134 in the back of the seal head 111. The recesses 134 do not extend through the seal head 111. It is impossible for the magnets 160 to come out as the tendency of the lines of force are to pull toward the mating ring 121. The magnets 160 may be installed next to each other in either opposite poles or same poles, for example, north-south, south-north. The magnets 160 can be press-fitted, glued, or formed in the seal head 111. The seal head 111 is made out of a nonmagnetic material such as either aluminum or plastic in order to save weight for aircraft applications and to reduce cost in volume automotive applications. The second variable magnetic rotary seal 110 has applications for the pump industry, blowers or bearing housings. The design enables itself to be pressure balanced from either direction by the fluid. The recesses 134 around the seal head 111 can be made to fit different size magnets The number of magnets 160 which are inserted determines the amount of pull needed. The recesses 134 in the seal head 111 can allow for additional magnets 160 to be inserted by the customer at their option. The recesses 134 in the seal head 111 can also be used to remove material for weight saving and also allow the fluid to pressurize the seal head 111. There is no magnetic shielding which is required as in the mating ring 121 of U.S. Pat. No. 2,843,403 making the seal less expensive to manufacture for high volume. The second variable magnetic rotary seal 110 also eliminates the chance of breaking the magnet 160 as can happen with "Alnico" mating rings. The seal head 111 can be molded in die cast with holes to reduce cost in volume for automotive applications. The use of lightweight materials enhances the life of the second variable magnetic rotary seal 110. The design lends itself to rear axel and automotive transmission. The cost of the second variable magnetic rotary seal 110 is slightly higher than lip seals with much longer life. The length of the sealing ring 112 can be increased by increasing the size and number of magnets 160 used. The magnetic pull is adjustable in order to maximize seal face life. The weight reduction also adds to longer seal life. The second variable magnetic rotary seal 110 uses a heat treated carbon steel face to run against a mating ring 121. The design offers simplicity because the mating ring 121 does not need any shielding to be pressed into a steel or non-magnetic material housing. The steel wear face of the mating ring 121 can be pressed into an aluminum or plastic part reducing weight of both components. The wear length of the face material or carbon can be increased by increasing the magnetic force of the magnets 160 in the seal head 111. The seal head 111 can be made of any non-magnetic material, such as plastic, brass, aluminum, rubber for lightweight aerospace applications. The magnets 160, either round or square, can be made from neodyminum iron-boron, permanent magnets, or any other suitable magnetic material of any strength with high or low energy rating. For water applications these magnets can be coated to prevent them from rusting. The seal head 111 is made from a solid piece of non metallic stock. Holes are drilled or cast around the back circumference of the seal head. Either round or square magnets 160 are inserted and either glued or pressed in place. The recesses 134 are not drilled through the entire width of the seal head 111. A slight amount of material is used to prevent the magnets 160 from making any contact with the mating ring 121 or coming out. Carbon, bronze, or any other material with good running characteristics, can be used as a seal face. Because of the variable magnetic forces, close alignment of the shaft is not required as by using "Alnico" materials. By use of special magnetic materials inserted in the seal head 111 the second variable magnetic rotary seal 110 can operate at temperatures at either 140° C. or 530° F.

The use of the second variable magnetic rotary seal 110 increases seal life and reliability and opens new low cost markets where seal life is important to the pump industries, blowers, and all bearing housings. The use of the second variable magnetic rotary seal 110 provides a seal with a greater magnetic force or variable magnetic force to continually have engagement in case of vibration from gears to drive mechanisms. Having extra recesses 134 in the seal head 111 reduces the weight of the part and the pressure force exerted in these recesses 134 will assist the magnetic force in sealing with no increase in weight. The rotating member is coupled to the shaft for rotational movement at the same time allowing it to move axially. This can also be accomplished with a positive slotted pin drive for very high speeds using the "O" ring to do the sealing on the shaft and the variable magnets to pull the faces shut. The amount of magnetic force required per application is determined by variation of the number of magnets and types of material. The rotating seal head 111 without springs seals against the mating ring 121.

From the foregoing it can be seen that a variable magnetic rotary seal has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A variable magnetic rotary seal which sealingly couples a shaft to a housing, said variable magnetic rotary seal comprising:
   a. a seal head which is formed out of a non-magnetic material and which has a first annular surface in a first plane with a circular groove therein and a second annular surface with a plurality of recesses each of which has a bottom wall;
   b. a sealing ring which is disposed in said circular groove and mechanically coupled thereto;
   c. first sealingly coupling means for sealingly coupling said seal head on the shaft;
   d. a mating ring which is formed out of a magnetic material which surrounds the shaft, said mating ring having an annular sealing surface in a second plane which is parallel and adjacent to the first plane of said seal head;
   e. second sealingly coupling means for sealingly coupling said mating ring in the housing against rotation relative to the housing; and
   f. a plurality of separate magnets each of which is disposed in one of said plurality of recesses of said seal head whereby said seal head draws said sealing ring and said mating ring toward each other so that said annular sealing surface of said mating ring engages with said sealing ring.

2. A variable magnetic rotary seal which sealingly couples a shaft to a housing, said variable magnetic rotary seal comprising:
   a. a seal head which is formed out of a magnetic material and which has a first annular surface in a first plane with a circular groove therein;
   b. a sealing ring which is disposed in said circular groove and mechanically coupled thereto;
   c. first sealingly coupling means for sealingly coupling said seal head on the shaft;
   d. a mating ring which is formed out of a non-magnetic material which surrounds the shaft, said mating ring having an annular sealing surface in a second plane which is parallel and adjacent to the first plane of said seal head with a circular groove therein and a second annular surface with a plurality of recesses each of which has a bottom wall;
   e. second sealingly coupling means for sealingly coupling said mating ring in the housing against rotation relative to the housing; and
   f. a plurality of separate magnets each of which is disposed in one of said plurality of recesses of said mating ring whereby said mating ring draws said sealing ring and said seal head toward each other so that said annular sealing surface of said mating ring engages with said sealing ring.

* * * * *